H. DOMBROWSKY.
Machines for Molding Cigars.

No. 146,126. Patented Jan. 6, 1874.

Witnesses
Oliver Drake
David Collins

Inventor
Herrmann Dombrowsky
By Drake & Co. his Att'ys

UNITED STATES PATENT OFFICE.

HERRMANN DOMBROWSKY, OF NEWARK, NEW JERSEY.

IMPROVEMENT IN MACHINES FOR MOLDING CIGARS.

Specification forming part of Letters Patent No. 146,126, dated January 6, 1874; application filed February 11, 1873.

*To all whom it may concern:*

Be it known that I, HERRMANN DOMBROWSKY, of the city of Newark, county of Essex and State of New Jersey, have invented certain Improvements in Cigar-Machines; and I do hereby declare the following to be a full, clear, and exact description of the same, reference being had to the accompanying drawings, and to the letters of reference marked thereon, and forming part of this specification.

The nature of my invention relates to an improvement in cigar-machines; and it consists in two rollers geared together, having the molds for the cigars formed in their peripheries, and which are placed upon hollow journals or cylinders, into which any suitable heated substance is inserted for heating the rollers, so as to dry the cigars, as will be more fully described hereafter.

The accompanying drawings represent my invention.

Figure 1:
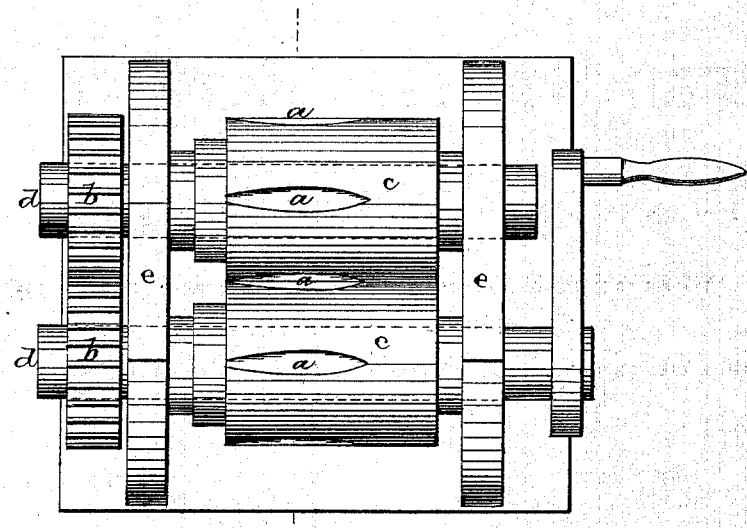
Figure 2:
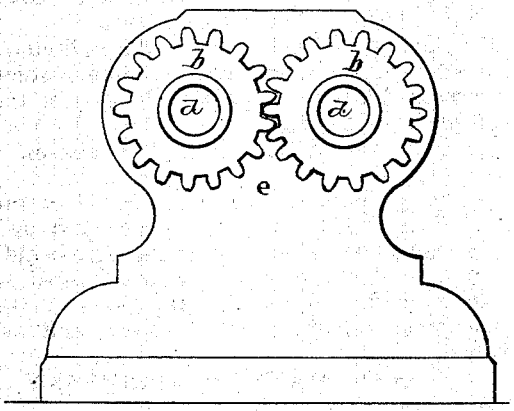
Figure 3:
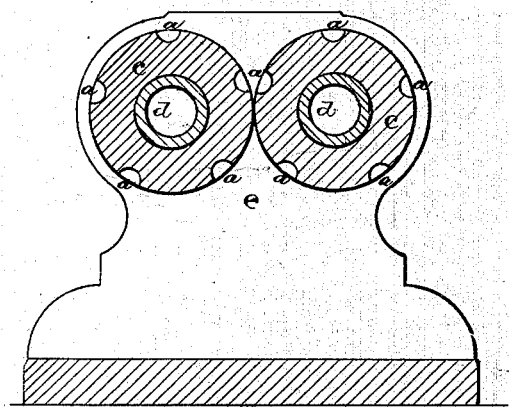

$c\ c$ represent two rollers, of suitable length and diameter, geared together by the two wheels $b\ b$, and which have the cigar-molds $a$ formed in their sides, and placed in such relation that as the rollers revolve the molds always come together, as shown in Figure 3, so as to press the fillings for the cigars placed in them firmly together, and mold them into the desired shape and size. Each of these rollers is secured, in any suitable manner, to a hollow journal, $d$, the ends of which project out beyond the supporting-standards $e$ at each end. Into these journals or cylinders are thrust red-hot iron bars, which impart their heat to the rollers, so as to dry the cigars while in the act of molding them.

If so desired, hot water, steam, or air may be used instead of the hot iron bars.

By placing the rollers upon the cylinders, as described, the rollers may be made of some inferior metal, so as to reduce the cost of the machine, if so desired.

Having thus described my invention, I claim—

A cigar-molding machine composed of the two rollers $c$, gears $b$, hollow journals $d$, and standards $e$, the rollers having the cigar-molds $a$ made in their peripheries, and adapted to both mold the cigars and dry them at the same time, substantially as shown and described.

HERRMANN DOMBROWSKY.

Witnesses:
OLIVER DRAKE,
DAVID COLLINS.